(12) United States Patent
Edgar et al.

(10) Patent No.: US 8,694,970 B2
(45) Date of Patent: Apr. 8, 2014

(54) UNIFIED DEBUG SYSTEM WITH MULTIPLE USER-CONFIGURABLE TRACE VOLUMES AND TRACE BUFFERS

(75) Inventors: Brian T. Edgar, Eden Prairie, MN (US); Mark A. Gaertner, Vadnais Heights, MN (US); Bhooshan S. Thakar, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 2098 days.

(21) Appl. No.: 11/143,338

(22) Filed: Jun. 2, 2005

(65) Prior Publication Data

US 2006/0277441 A1 Dec. 7, 2006

(51) Int. Cl.
| | | |
|---|---|---|
| G06F 9/44 | (2006.01) | |
| G06F 11/00 | (2006.01) | |
| G06F 12/06 | (2006.01) | |
| G06F 13/00 | (2006.01) | |

(52) U.S. Cl.
USPC ............... 717/125; 714/45; 714/46; 711/5; 711/170; 717/128

(58) Field of Classification Search
None
See application file for complete search history.

(56) References Cited

U.S. PATENT DOCUMENTS

| | | | | |
|---|---|---|---|---|
| 5,627,843 | A | 5/1997 | Deng et al. ............... 371/37.1 |
| 5,894,575 | A * | 4/1999 | Levine et al. ............. 717/128 |
| 6,057,981 | A | 5/2000 | Fish et al. ............. 360/97.01 |
| 6,094,729 | A | 7/2000 | Mann ............................. 714/25 |
| 6,142,683 | A | 11/2000 | Madduri .................. 395/704 |
| 6,145,112 | A | 11/2000 | Fujita et al. ................ 714/784 |
| 6,145,123 | A * | 11/2000 | Torrey et al. ................ 717/128 |
| 6,189,140 | B1 | 2/2001 | Madduri ....................... 717/4 |
| 6,202,199 | B1 * | 3/2001 | Wygodny et al. .......... 717/125 |

(Continued)

OTHER PUBLICATIONS

Roni Rosner, Avi Mendelson and Ronny Ronen, "Filtering Techniques to Improve Trace-Cache Efficiency", 12 pages, available at http://www.intel.com/research/mrl/Library/trace_filtering.pdf (accessed Feb. 10, 2005); published in *Parallel Architectures and Compilation Techniques (PACT 2001): 2001 International*, IEEE Computer Society (ed.), Dec. 1, 2001, pp. 37-48.

*Primary Examiner* — Tuan Q. Dam
*Assistant Examiner* — Zheng Wei
(74) *Attorney, Agent, or Firm* — Alan G. Rego; Westman, Champlin & Koehler, P.A.

(57) ABSTRACT

A unified debug system with multiple user-configurable trace volumes is disclosed, including embodiments as a system, a method, and a computer-readable medium. Embodiments of the present invention provide more robust and flexible solutions for introducing configurable trace volumes to firmware, allowing a user to specify firmware system configurations for trace buffers, trace frames, and trace volumes, and offer other advantages over the prior art. One embodiment of the present invention pertains to a system that includes a firmware component comprising firmware, and a firmware interface communicatively connected to the firmware component. The firmware includes a plurality of trace volumes for storing a plurality of trace entries. The trace volumes are user-configurable through the firmware interface. The plurality of trace volumes includes first, second and third trace volumes. The first trace volume includes storing at least some of the trace entries to a trace buffer in a first volatile memory component. The second trace volume includes storing at least some of the trace entries to one or more trace buffers in one or more trace frames in a second volatile memory component. The third trace volume includes storing at least some of the trace entries to one or more trace buffers in one or more trace frames in a non-volatile memory component.

20 Claims, 5 Drawing Sheets

(56) References Cited

U.S. PATENT DOCUMENTS

| | | | |
|---|---|---|---|
| 6,205,569 B1 | 3/2001 | Forehand et al. | 714/763 |
| 6,282,701 B1 * | 8/2001 | Wygodny et al. | 717/125 |
| 6,470,388 B1 | 10/2002 | Niemi et al. | 709/224 |
| 6,526,567 B1 | 2/2003 | Cobbett et al. | 717/124 |
| 6,600,614 B2 | 7/2003 | Lenny et al. | 360/31 |
| 6,606,210 B1 | 8/2003 | Coker et al. | 360/53 |
| 6,643,802 B1 | 11/2003 | Frost et al. | 714/37 |
| 6,671,827 B2 | 12/2003 | Guilford et al. | 714/38 |
| 6,690,524 B1 | 2/2004 | Wakefield et al. | 360/51 |
| 6,708,173 B1 | 3/2004 | Behr et al. | 707/10 |
| 6,711,520 B2 | 3/2004 | Arnaout et al. | 702/119 |
| 6,732,307 B1 * | 5/2004 | Edwards | 714/724 |
| 6,754,891 B1 * | 6/2004 | Snyder et al. | 717/128 |
| 6,766,438 B1 | 7/2004 | Haas | 712/41 |
| 6,771,440 B2 | 8/2004 | Smith | 360/31 |
| 6,832,345 B2 | 12/2004 | Corteville et al. | 714/48 |
| 6,839,654 B2 | 1/2005 | Rollig et al. | 702/178 |
| 6,839,892 B2 | 1/2005 | Dawkins et al. | 717/124 |
| 6,877,114 B2 * | 4/2005 | Allen et al. | 714/45 |
| 6,922,417 B2 * | 7/2005 | Vanlint | 370/503 |
| 7,069,176 B2 * | 6/2006 | Swaine et al. | 702/176 |
| 7,213,113 B2 * | 5/2007 | Sahin et al | 711/162 |
| 7,278,058 B1 * | 10/2007 | Narisi | 714/38 |
| 7,380,239 B1 * | 5/2008 | Srivastava et al. | 717/128 |
| 7,389,494 B1 * | 6/2008 | Cantrill | 717/125 |
| 7,506,314 B2 * | 3/2009 | Kollmann et al. | 717/128 |
| 7,552,304 B2 * | 6/2009 | Marchal et al. | 711/170 |
| 7,721,266 B2 * | 5/2010 | Frey et al. | 717/128 |
| 7,739,668 B2 * | 6/2010 | Cruickshank et al. | 717/128 |
| 7,770,156 B2 * | 8/2010 | Thekkath | 717/128 |
| 8,112,677 B2 * | 2/2012 | Barlow et al. | 714/46 |
| 8,181,161 B2 * | 5/2012 | Kollmann et al. | 717/128 |
| 2001/0050903 A1 * | 12/2001 | Vanlint | 370/252 |
| 2003/0061550 A1 * | 3/2003 | Ng et al. | 714/45 |
| 2003/0131039 A1 * | 7/2003 | Bajoria et al. | 709/1 |
| 2004/0064685 A1 * | 4/2004 | Nguyen et al. | 712/227 |
| 2004/0128658 A1 * | 7/2004 | Lueh et al. | 717/151 |
| 2004/0153998 A1 * | 8/2004 | McGuire et al. | 717/128 |
| 2004/0199902 A1 * | 10/2004 | Dodson et al. | 717/128 |
| 2005/0033553 A1 * | 2/2005 | Swaine et al. | 702/176 |
| 2005/0132337 A1 * | 6/2005 | Wedel et al. | 717/128 |
| 2006/0184829 A1 * | 8/2006 | Cheong et al. | 714/39 |
| 2008/0059844 A1 * | 3/2008 | Miyamoto | 714/45 |
| 2008/0148239 A1 * | 6/2008 | Petrov et al. | 717/128 |
| 2008/0313504 A1 * | 12/2008 | Wedel et al. | 714/45 |
| 2009/0119548 A1 * | 5/2009 | Kollmann et al. | 714/45 |
| 2012/0079324 A1 * | 3/2012 | Aphale | 714/26 |
| 2012/0331354 A1 * | 12/2012 | Xu et al. | 714/45 |

\* cited by examiner

UNIFIED DEBUG SYSTEM WITH MULTIPLE USER-CONFIGURABLE TRACE VOLUMES AND TRACE BUFFERS

FIELD OF THE INVENTION

The present invention relates generally to the art of debug systems, and particularly but not by way of limitation, to a unified debug system with multiple trace volumes, including user-specifiable configurations for trace buffers and trace frames.

BACKGROUND OF THE INVENTION

Debugging code is an important part of software development, including as part of the development of firmware. Firmware sometimes includes an internal debug system, which may record trace entries to provide a record of state information. These recorded trace entries can then be used to reconstruct behavior that may have led to an unpredicted or undesired result, and to resolve such behavior as part of the debug process. The firmware debug system employs certain configurable trace buffers, trace frames, and trace volumes for storing trace entries. Altered trace buffers, frames, and volumes are sometimes introduced by downloading a different release of firmware onto the host device.

SUMMARY OF THE INVENTION

A unified debug system with multiple user-configurable trace volumes is disclosed, including embodiments as a system, a method, and a computer-readable medium. Embodiments of the present invention provide more robust and flexible solutions for introducing configurable trace volumes to firmware, allowing a user to specify firmware system configurations for trace buffers, trace frames, and trace volumes, and offer other advantages over the prior art.

One embodiment of the present invention pertains to a system that includes a firmware component comprising firmware, and a firmware interface communicatively connected to the firmware component. The firmware includes a plurality of trace volumes for storing a plurality of trace entries. The trace volumes are user-configurable through the firmware interface. The plurality of trace volumes includes first, second and third trace volumes. The first trace volume includes storing at least some of the trace entries to a trace buffer in a first volatile memory component. The second trace volume includes storing at least some of the trace entries to one or more trace buffers in one or more trace frames in a second volatile memory component. The third trace volume includes storing at least some of the trace entries to one or more trace buffers in one or more trace frames in a non-volatile memory component.

Another embodiment of the present invention pertains to a method including several steps. The method includes providing to an interface a plurality of user-configurable trace volumes for storing trace entries. The method also includes receiving from the interface a user-specified trace configuration selected from among the plurality of user-specifiable trace configurations. The method also includes storing a plurality of trace entries in accordance with the user-specified trace configuration. The plurality of user-specifiable trace configurations includes first, second and third trace configurations. In the first trace configuration, trace entries are stored to a trace buffer in a first volatile memory component. In the second trace configuration, each trace entry is stored to a respective trace buffer among one or more trace buffers in a respective trace frame among one or more trace frames in a second volatile memory component. In the third trace configuration, each trace entry is stored to a respective trace buffer among one or more trace buffers in a respective trace frame among one or more trace frames in a non-volatile memory component.

Another embodiment of the present invention pertains to a computer-readable medium, permanently contained within a device configured for reading the computer-readable medium and for storing data. The computer-readable medium includes computer-executable instructions which, when executed by the device, configure the device to provide to an interface a plurality of user-configurable trace volumes for storing trace entries in the device. The computer-executable instructions also configure the device to receive from the interface a user-configured trace volume selected from among the plurality of user-configurable trace volumes. The computer-executable instructions further configure the device to store a plurality of trace entries in the device in accordance with the user-configured trace volume. The plurality of user-configurable trace volumes includes first, second and third trace volumes. The first trace volume includes storing at least some of the trace entries in a trace buffer in a first volatile memory component. The second trace volume includes storing at least some of the trace entries in a respective trace buffer among one or more trace buffers in a respective trace frame among one or more trace frames in a second volatile memory component. The third trace volume includes storing at least some of the trace entries to a respective trace buffer among one or more trace buffers in a respective trace frame among one or more trace frames in a non-volatile memory component.

Other features and benefits that characterize embodiments of the present invention will be apparent to those skilled in the art from the following detailed description and the associated drawings.

DETAILED DESCRIPTION OF ILLUSTRATIVE EMBODIMENTS

Embodiments of the present invention provide more robust and flexible solutions for allowing a user to specify firmware system configurations for trace buffers, trace frames, and trace volumes, and offer other advantages over the prior art. The efficiency of debugging operations is often largely a function of the flexibility and ease of configuring the debug trace buffers, frames, and volumes. Embodiments of the present invention include a single system that offers a variety of trace buffers, trace frames, and trace volumes and possible configurations thereof to a user through a firmware interface. A user involved in debug operations can freely configure trace buffers, trace frames, and trace volumes through the firmware interface, rather than having to stop and try to download a different firmware release each time the user desires to select or configure a new trace volume. The user can therefore quickly and easily optimize trace volumes and configurations of trace buffers and trace frames, for a given debug task. Additional aspects and advantages are described in greater detail as follows.

Figure 1:
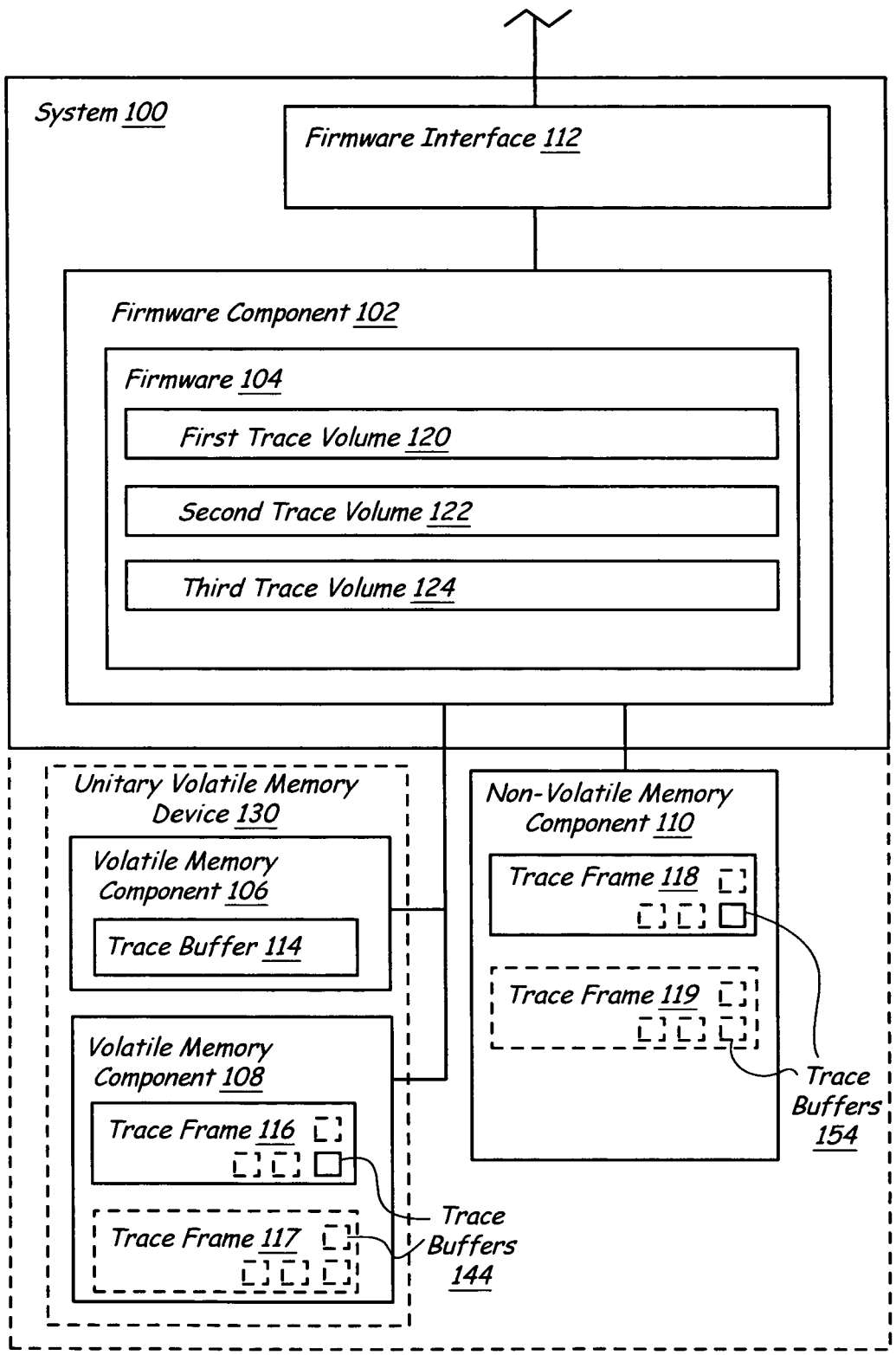
FIG. 1 schematically depicts a system according to an illustrative embodiment.

FIG. 1 schematically depicts a system 100 according to one illustrative embodiment of the present invention. System 100 includes a firmware component 102, and a firmware interface 112 communicatively connected to the firmware component 102. Firmware component 102 includes firmware 104, which includes trace volumes 120, 122, and 124. Firmware component 102 is communicatively connected to first volatile memory component 106, second volatile memory component 108, and non-volatile memory component 110, which may or may not be included in system 100, according to different embodiments. First volatile memory component 106 includes trace buffer 114. Second volatile memory component 108 includes at least one trace frame 116, and may contain additional trace frames such as trace frame 117, and contains one or more trace buffers 144 in the trace frames 116, 117. First volatile memory component 106 and second volatile memory component 108 may be contained in a single, unitary volatile memory device 130, in one illustrative embodiment. Non-volatile memory component 110 includes at least one trace frame 118, and may contain additional trace frames such as trace frame 119, and contains one or more trace buffers 154 in the trace frames 118, 119. These components of system 100 are described in greater detail as follows.

System 100 may be anything capable of comprising firmware and a firmware interface that interfaces between the firmware and an external system. In one illustrative embodiment, system 100 may include an integrated circuit disposed on a data storage device, for example. In other illustrative embodiments, system 100 may include a data storage device, a computer, or a networked system of computers, for example. The firmware component 102 includes firmware 104; for example, firmware component 102 may include a storage medium having firmware software stored thereon, and a processor in communication with the storage component and configured to execute the firmware software, in one illustrative embodiment.

In the embodiment of FIG. 1, the firmware interface 112 is communicatively connected to the firmware component, and is also configured to be communicatively connected to an external system or device. For example, firmware interface 112 may be communicatively connected to a user input/output system to provide information to a user and to receive instruction from a user, for example. The communicative connection between the firmware interface 112 and the user input/output system may include an internal computer bus, a universal serial bus, a network connection, or other known communicative connection solutions, for example. The user input/output system may include output through a graphical user interface application or plain text displayed on a monitor, for example, and input through a keyboard, a mouse, a device for reading portable storage media, or other known input/output solutions, in various embodiments of the present invention.

The firmware 104 stored on the firmware component 102 includes a plurality of trace volumes, including first trace volume 120, second trace volume 122, and third trace volume 124. In an illustrative embodiment, at least one of trace volumes 120, 122, 124 includes a set of computer-executable instructions that can be configured or specified by a user or external party, from among a variety of trace volume options, that determines how system 100 captures, stores, or retains trace entries in the trace buffers and trace frames available to it. An illustrative one of trace volumes 120, 122, 124 includes causing the system 100 to store at least some of the trace entries in a trace buffer in a memory component. The trace buffer may be in a trace frame. In an illustrative embodiment, a trace buffer of system 100 includes a time-ordered string of trace entries.

A trace buffer can be either wrapping or non-wrapping. A trace buffer is wrapped when, after it becomes filled with trace entries, new trace entries are written over pre-existing trace entries, occupying the storage space earlier occupied by the pre-existing trace entries and erasing the pre-existing trace entries in the process. In an illustrative embodiment, a trace frame of system 100 includes physical storage comprising a contiguous chunk of trace memory in which one or more trace buffers resides. A trace volume may also include a retention policy enforced for the trace associated with the trace volume, such as if or when trace entries associated with the trace volume will be overwritten or wrapped. The collecting activity of capturing, storing and retaining trace entries can collectively be referred to as storing trace entries, in the context of trace volumes for storing a plurality of trace entries. A user can configure a trace volume by specifying a trace volume from among several available trace volume options, as well as by specifying parameters within a single trace volume.

Not all trace volumes may be applicable to system 100, based on its environment. For example, in some embodiments, system 100 may only have volatile storage components available to it, such as volatile memory components 106, 108, but no non-volatile storage components. In another example, system 100 may only have one volatile storage component (e.g. 106) and one relatively fast non-volatile storage component (e.g. 110) available to it, but no second volatile memory component. In such environments, system 100 detects the memory components available to it and provides information on what trace volumes or trace volume parameters are available, in one embodiment.

In one illustrative embodiment, first trace volume 120 is known as a fast trace volume; second trace volume 122 is known as a volatile non-fast trace volume; and third trace volume 124 is known as a save-on-update non-fast trace volume. Each of trace volumes 120, 122, 124 is configured for storing a plurality of trace entries, and each of trace volumes 120, 122, 124 is user-configurable through the firmware interface. The user-configurability of trace volumes 120, 122, 124 includes the ability for the user to select a subset of the three trace volumes to enable, in one embodiment. In other illustrative embodiments, the user is further able to configure one or more parameters of trace storage behavior within one or more of the trace volumes 120, 122, 124. As one illustrative example of a user-configurable parameter within one of trace volumes 120, 122, 124, the time interval for the firmware to record a nonvolatile timestamp could be selected by the user. User-configurable parameters, including including the timestamp save interval, are described in greater detail below.

In one illustrative embodiment, the first trace volume 120 is a fast trace volume, in which at least some of the trace entries are stored in a trace buffer in a first volatile memory component 106. First trace volume 120 is intended to provide the fastest available trace storage, in this embodiment. For that purpose, first volatile memory component 106 has a rate of storage at least as fast as any memory component comprised in system 100, in this embodiment. In another illustrative embodiment, first volatile memory component 106 is one of the fastest data storage components available to system 100.

In one embodiment, the trace buffer in the first volatile memory component 106 is a circular trace buffer. In this embodiment, trace entries are simply stored from one end of the trace buffer to the other in linear order, and when the end is reached, the storage of new trace entries wraps back to the beginning of the trace buffer 114, so that trace entries are stored from the beginning again, recording over the previous series of trace entries. Fast trace buffer 114 is further depicted in FIG. 2 and described below in connection therewith.

Figure 2:
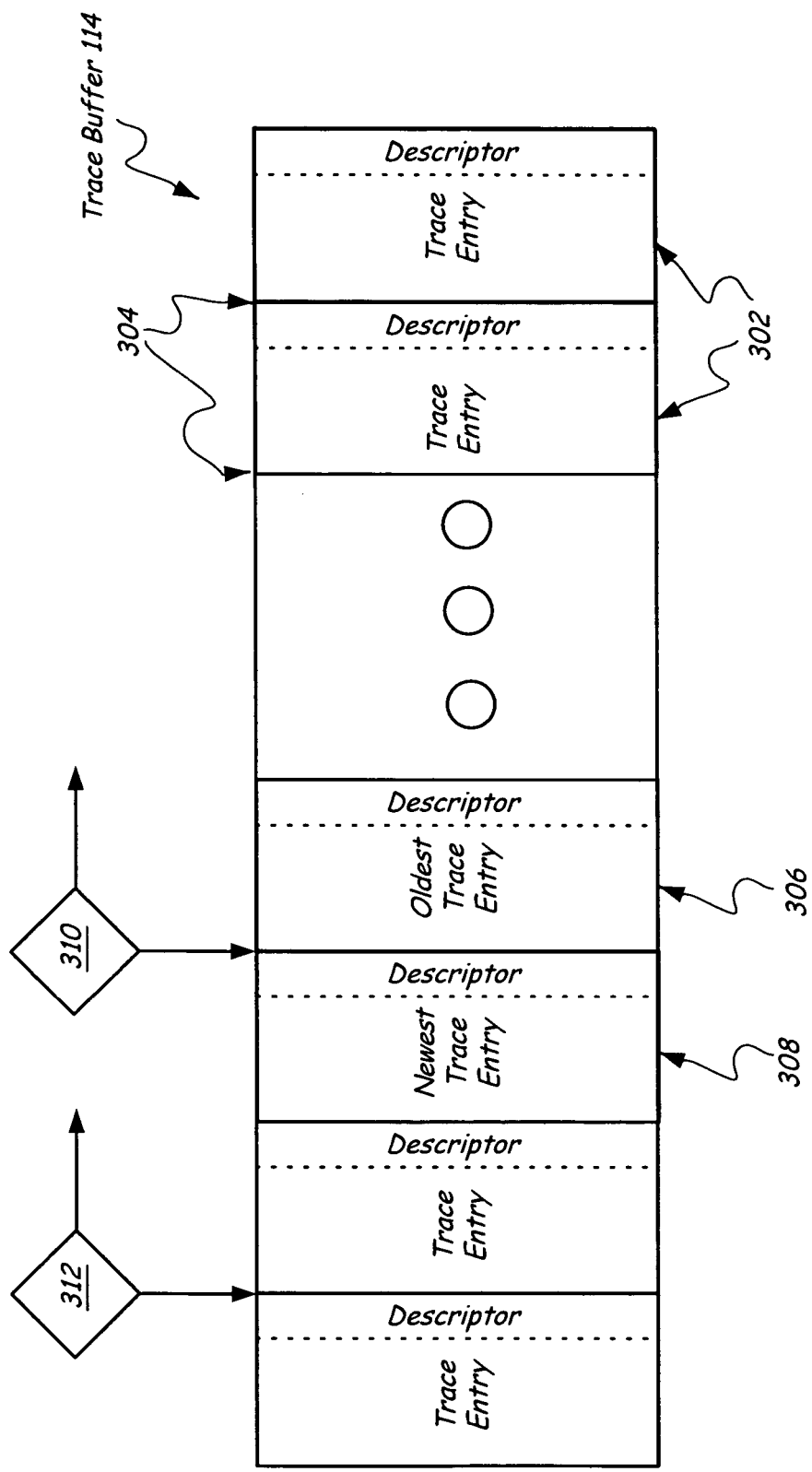
FIG. 2 schematically depicts a trace buffer according to an illustrative embodiment.

FIG. 2 illustrates additional detail of the fast trace buffer 114 according to one illustrative embodiment. A series of trace entries have been recorded throughout trace buffer 114, including representative trace entries 302, and are separated by boundaries such as representative boundaries 304. (The series of circles in the midst of trace buffer 114 merely indicates a discontinuity in the depiction, since the real trace buffer would store more trace entries than can feasibly be depicted.) New trace entries are stored from left to right, following the conventions of the depiction in FIG. 2. Trace entry 306 is the oldest trace entry that has not yet been fully overwritten, while trace entry 308 is the most recently stored trace entry. Index 310 represents a NextEntryStartIndex, which indexes where new trace entry storage is to take place. Index 310 is depicted with one arrow on fast trace buffer 114 to indicate where new trace entries are to be stored, and another arrow directed to the right to indicate the direction of propagation of the index and of new trace entry storage. As depicted, the NextEntryStartIndex 310 is poised to record over oldest trace entry 306 with its next new trace entry. The fast trace buffer 114 stores a high level of detail, potentially enough to wrap the fast trace buffer 114 several times per second in this embodiment and using parameters of some current systems. The trace entries stored can be of various sizes; the size of each trace entry is stored in a descriptor at the leading edge of each trace entry. Because fast trace buffer 114 is circular, any index can advance from a current 32-bit word in the buffer 114 to the next 32-bit word by adding 1 to the index of the current word and taking the modulus.

Index 312 is a SpoolingProgressSource index. In this illustrative embodiment, spooling includes the storage of data, such as trace entries, from a first memory component to a second memory component, subsequent to its original storage in the first memory component. Spooling of the fast trace buffer 114 is particularly desirable, to provide longer-term storage and retention of the trace entries in the fast trace volume, which has the shortest retention of trace entries, in this embodiment. SpoolingProgressSource index 312 indexes the progress of a spooling process, which spools trace entries from fast trace buffer 114 to a volatile or non-volatile memory component such as volatile memory component 108 or non-volatile memory component 110 (depicted in FIG. 1), or another memory component available to system 100 through a communicative connection. Any trace entries behind (or to the left of in this depiction) the SpoolingProgressSource index 312 can be overwritten with new trace entries without causing a loss of any trace entry information, because those trace entries have already been spooled, or stored, to another location. In this embodiment, the new location on a volatile or non-volatile memory component will keep more of the trace entries stored for a much longer time, as they are no longer competing for more valuable fast trace memory space.

Whenever spooling progress is made, i.e. the SpoolingProgressSource index 312 progresses forward (i.e. to the right) along trace buffer 114, the spooling operation momentarily blocks fast trace storage. This causes the NextEntryStartIndex 310 to point to a trace entry boundary such as one of representative trace entry boundaries 304, and check to see if the NextEntryStartIndex 310 is a certain distance from the last entry boundary 304 known to the spooling process, which was sampled in an earlier instance of spooling progress. If it is, NextEntryStartIndex 310 becomes the new last entry boundary 304 known to the spooling process. The SpoolingProgressSource index 312 is not required to be at an entry boundary, which contributes to the performance of spooling the fast trace entries to long-term storage in a non-volatile memory component, in this embodiment. When NextEntryStartIndex 310 overtakes SpoolingProgressSource 312, a discontinuity must exist in the spooled fast trace. Since SpoolingProgressSource 312 may not be at an entry boundary, the discontinuity may not be at an entry boundary. It is in the face of such discontinuities that the record of known entry boundaries in the spooled fast trace allows a fast trace parser to interpret much of what the spooling operation has stored.

In one embodiment, the fast trace spooling from the volatile memory component 106 can be intrusive, so that the trace entries from the first volatile memory components 106 are spooled to a larger memory in priority over other tasks being executed by the system. In another embodiment, the fast trace spooling can be non-intrusive, so that the trace entries from the first volatile memory component 106 are spooled to a larger memory only when doing so would not interfere with other tasks being executed by the system, or when the firmware has spare processor time.

In an illustrative embodiment, at least some of the trace entries comprise a timestamp, recorded at a regular interval of between 0 and 65,536 microseconds. The specific interval is one of the parameters within a trace configuration that can be selected by the user as part of specifying the trace configuration, in one illustrative embodiment. In another illustrative embodiment, the trace configurations are set with a default interval of 25 milliseconds, while that default interval can be replaced by a user-specified interval as part of specifying the trace configuration. For example, in one illustrative embodiment, in the first trace configuration 120, the system records a 64-bit timestamp in the fast trace buffer 114 at a default interval of every 25 milliseconds. Each timestamp is 64 bits in this embodiment: 48 bits are dedicated to the estimated total power on time (which can be rounded to the nearest microsecond), and the other 16 bits are dedicated to recording the number of power cycles that had occurred prior to the recording of the timestamp.

Not all entries in the fast trace buffer 114 have timestamps, in the interests of increasing trace performance and trace memory utilization, in some embodiments. In one embodiment, when a timestamp is assigned to a fast trace entry according to the first trace configuration, it is a small timestamp of only 16 bits, rather than 64 bits as in a periodic timestamp. The first trace configuration also involves a fast trace parser that can later determine and fill in the remaining 48 bits of the timestamp, based on the upper 48 bits of the closest periodic timestamps. When no trace is being generated in the system 100, i.e. when the system 100 is idle and has no significant activity, it may be desirable to prevent the fast trace from filling up with periodic timestamps. Whenever the fast trace configuration 120 stores onto the fast trace buffer 114 a second consecutive trace entry with a 64-bit periodic timestamp, indicating that there are no intervening fast trace entries whose small timestamps need to be resolved, a collapsible timestamp is stored. When the time comes to store a full timestamp, and the most recent entry stored was a collapsible full timestamp, the collapsible timestamp is updated in lieu of creating a new fast trace entry, in this illustrative embodiment.

In one illustrative embodiment, the second trace configuration 122 is a volatile non-fast trace configuration, in which at least some of the trace entries are stored in one or more trace buffers 144 in one or more trace frames, such as representative trace frames 116, 117 in a second volatile memory component 108. This second volatile memory component 108 may either be comprised in a unitary volatile memory device 130 with the first volatile memory component 106, such that the two volatile memory components 106, 108 may be merely different sections of the single volatile memory device 130; or the first volatile memory component 106 and the second volatile memory component 108 are comprised in separate volatile memory devices, in different embodiments. (Unitary volatile memory device 130 is depicted in dashed lines to emphasize that it is optional from one embodiment to another. The portion of system 100 surrounding memory components 106, 108, 110 is similarly depicted in dashed lines to emphasize that these components may be included in system 100 or external to system 100.)

Figure 3:
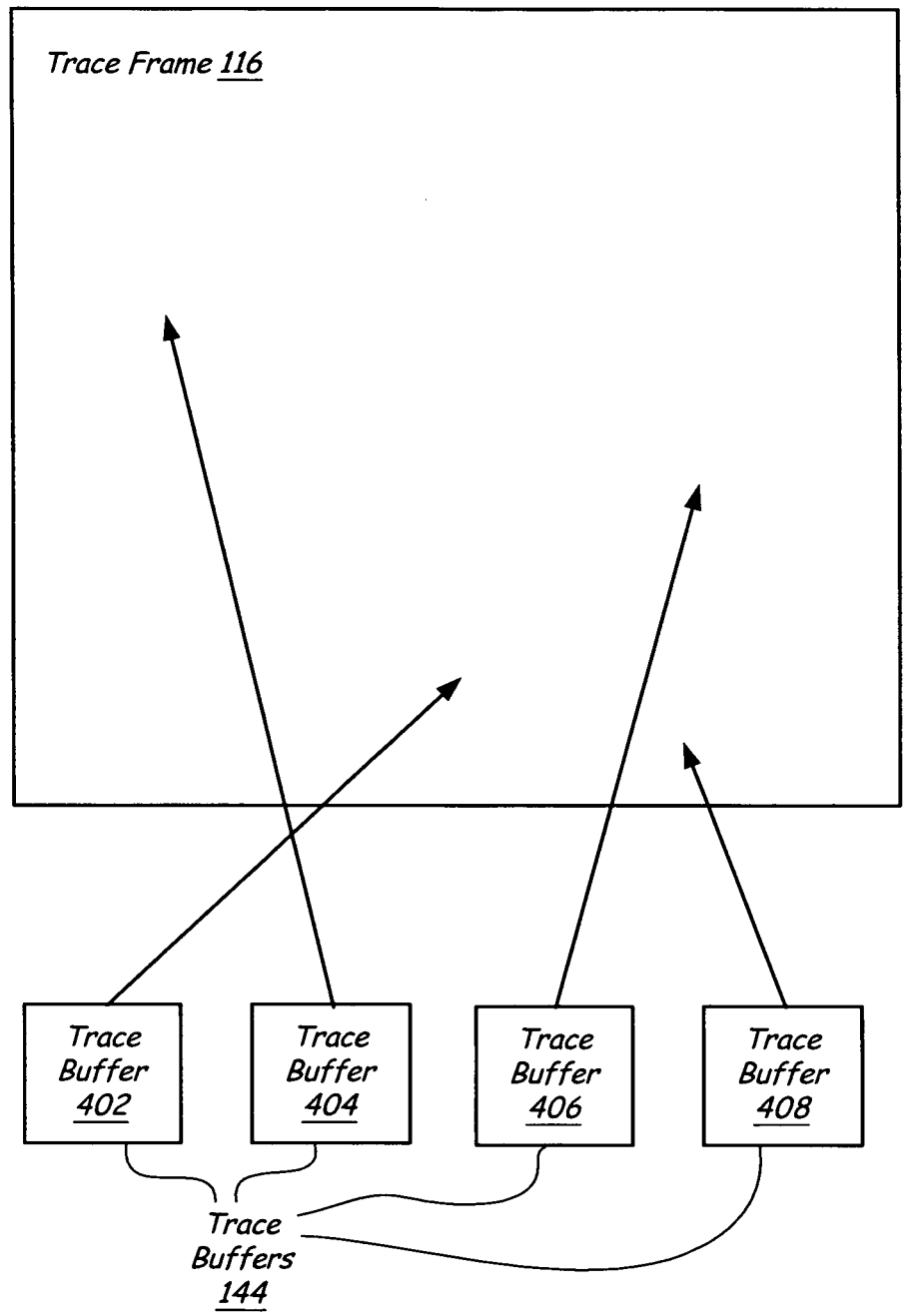
FIG. 3 schematically depicts a trace frame according to an illustrative embodiment.

FIG. 3 depicts trace frame 116 of second volatile memory component 108, and trace buffers 144 being written to trace frame 116. In this illustrative embodiment, each trace entry stored in trace frame 116 is stored in one of trace buffers 144. Trace buffers 144 do not have their own dedicated memory, in this illustrative embodiment. Instead, multiple trace buffers 144, such as trace buffers 402, 404, 406 and 408, compete for trace storage memory in trace frame 116. Initially, a trace frame is empty of trace. As trace entries are stored for the various trace buffers 144, the trace frame 116 becomes filled with stored trace entries from one end of the trace frame to the other. The trace entries are thereby stored contiguously within trace frame 116, in this embodiment. This allows firmware 104, executing the second trace configuration, to use straightforward techniques to copy or spool trace frame 116 to longer-term storage, such as on non-volatile memory component 110 or an additional non-volatile memory component available to system 100 via a communicative connection, either internal or external to system 100. In another illustrative embodiment, the trace entries within a single defined trace buffer can be scattered throughout the physical memory of trace frame 116, using dynamic trace memory allocation. Various software techniques are well known for managing trace buffers, in an illustrative embodiment.

When trace frame 116 becomes full, new trace entries must be written over old trace entries within trace frame 116. Each trace buffer in trace frame 116 may have a minimum size, in one illustrative embodiment. The minimum size only becomes relevant when trace frame 116 is full and new trace entries must be written over old trace entries. In this embodiment, second trace configuration 122 uses a two-step protocol for deciding what trace entry content to write over within a trace frame 116. In the first step, second trace configuration 122 causes system 100 to write new trace entries in trace buffers over the oldest content within other trace buffers that are over their minimum size. Each trace buffer that is over its minimum size has some of its content written over until that trace buffer is down to its minimum size, i.e. only the minimum content is left in that trace buffer. After all the trace buffers 144 in trace frame 116 are down to their minimum size, either because they were only written in their minimum size to begin with, or because they have been partially overwritten, then the second step begins, when new trace entries recorded in trace buffers are written over the oldest entries in the same trace buffer.

In this illustrative embodiment, each trace entry stored in trace frame 116 includes a full-width timestamp. The timestamp allows for trace entries stored in trace frame 116, and others like it in second volatile memory component 108, to be time-correlated with trace entries in the other memory components of system 100. In one illustrative embodiment, the second trace volume further includes a parallel timestamp being stored in the first trace buffer 114 corresponding to each of the trace entries stored in the second volatile memory component 108. In another illustrative embodiment, the third trace volume further comprises a parallel timestamp being stored in the first trace buffer 114 corresponding to each of the trace entries stored in the non-volatile memory component 110. This establishes a time correlation between trace entries stored in either the second volatile memory component 108 or the non-volatile memory component 110, with trace entries stored in the fast trace buffer 114 in the first volatile memory component 106.

In one embodiment, at least one of the trace frames in the second volatile memory component 108 is a trigger capture trace frame of suitable size for a trigger capture trace entry, in which state information is captured in response to a trigger. A trigger capture trace entry is among the largest of trace entries, in which a potentially large amount of state information is captured in response to a trigger, in this illustrative embodiment. A trigger capture trace frame has only one trace buffer, in this embodiment, so that all trace from the trigger capture can be stored contiguously. Different aspects of system state information can be specified as parameters by a user within the trace volume. A trigger is configured for when the firmware receives information indicating a catastrophic event or other error. In response to the trigger, the firmware executes a trigger capture, in which the firmware captures and stores state information to the trigger capture frame. Which state information is stored can be specified by the user as part of the user-configurable parameters of the applicable trace volume, in this embodiment.

In one illustrative embodiment, trigger responses can include saving a trigger capture, or saving or spooling trace entries that have been accumulating in volatile memory component 108 that might normally have been wrapped over, to non-volatile memory component 110 or another non-volatile memory component. Other trigger responses in various embodiments can include resetting system 100; halting the operation of system 100 for a "back door" debug; or disallowing certain system operations, such as reading from or writing to a particular memory component, for example. In different embodiments, various trigger capture configuration parameters such as these for trigger capture and response to triggers can be freely configured by the user through the firmware interface, in common with the centralized firmware interface for configuring and/or specifying the trace configurations.

In another illustrative embodiment, at least one of the trace frames in the second volatile memory component is a fast wrap trace frame. The fast wrap trace frame comprises more than one trace buffer. In this embodiment, for the fast wrap trace frame, the second trace volume 122 includes causing the system 100 to store trace entries in the trace buffers in the fast wrap trace frame at a rate that is fast relative to a rate at which the trace buffers are spooled from the trace frame to the non-volatile memory component 110. Because of this, it is expected that the fast wrap trace frame will typically become full, that new trace entries will be written over older trace entries within the fast wrap trace frame on relatively short time scales compared to the rate of trace entry storage, and that typically, only some of the trace entries stored to the fast wrap trace frame will end up being spooled from the fast wrap trace frame to the spooling destination memory, such as non-volatile memory component 110.

In another illustrative embodiment, at least one of the trace frames in the second volatile memory component is a slow wrap trace frame. The slow wrap trace frame comprises more than one trace buffer. In this embodiment, for the slow wrap trace frame, the second trace volume 122 includes causing the system 100 to store trace entries in the trace buffers in the slow wrap trace frame at a rate that is slow relative to a rate at which the trace buffers are spooled from the trace frame to the non-volatile memory component 110. Because of this, it is expected that the slow wrap trace frame will typically not become full, and that new trace entries will typically (but not always) not yet have filled the slow wrap trace frame before the trace entries are spooled, so that typically, all of the trace entries stored to the slow wrap trace frame will end up being spooled from the slow wrap trace frame to the spooling destination memory, such as non-volatile memory component 110. However, the slow trace frame may become full, and new trace entries will still be stored over older trace entries when the slow trace frame is full.

In another illustrative embodiment, at least one of the trace frames in the second volatile memory component is a non-wrap trace frame. In the non-wrap trace frame, each trace buffer is allocated a total size. In this embodiment, the second trace volume includes causing the system 100 to store trace entries in the trace buffers until each trace buffer reaches its total size, and to store trace entries in the non-wrap trace frame until it is full, then to stop storing new trace entries in the non-wrap trace frame. In this way, the second trace volume provides an option for all trace entries stored to the trace frame to be spooled to a spooling destination memory, such as non-volatile memory component 110. The non-wrap trace frame provides unique advantages by preserving the trace entries for the oldest traceable events in a system in favor of more recent events. For example, in one illustrative embodiment in which the system is a disc drive, stored trace entries for the oldest events may help determine when the first recovered servo errors began to occur.

In one illustrative embodiment, the third trace volume 124 causes the system 100 to store at least some of the trace entries to one or more trace buffers in one or more trace frames in a non-volatile memory component 110. In this embodiment, the third trace volume 124 is a save-on-update non-fast trace volume, in which at least some of the trace entries are stored in one or more trace buffers 154 in one or more trace frames, such as representative trace frames 118, 119, in a non-volatile memory component 110. Trace entries stored in non-volatile memory component 110 will remain stored in the event of a loss of power to, or loss of operation of, system 100 or to memory components 106, 108, 110 in embodiments in which these are external to system 100.

In another illustrative embodiment, at least one of the trace frames in the non-volatile memory component 110 is a lifetime trace frame. The lifetime trace frame comprises trace buffers with trace entries configured to persist for the lifetime of the system 100. In one illustrative embodiment, the lifetime trace frame contains one trace buffer for drive formats and another trace buffer for firmware downloads. It is expected that the lifetime trace frame will never wrap, although it is capable of wrapping.

In another illustrative embodiment, at least one of the trace frames in the non-volatile memory component is a configuration and defect management history trace frame. This trace frame includes a plurality of trace buffers that may be overwritten, and that are expected to wrap. In one illustrative embodiment, system 100 includes a SCSI disc drive, and the configuration and defect management history trace frame includes a trace buffer for Mode Select commands, another trace buffer for Log Select commands, and another trace buffer for automatic reassignments, among other trace buffers.

Figure 4:
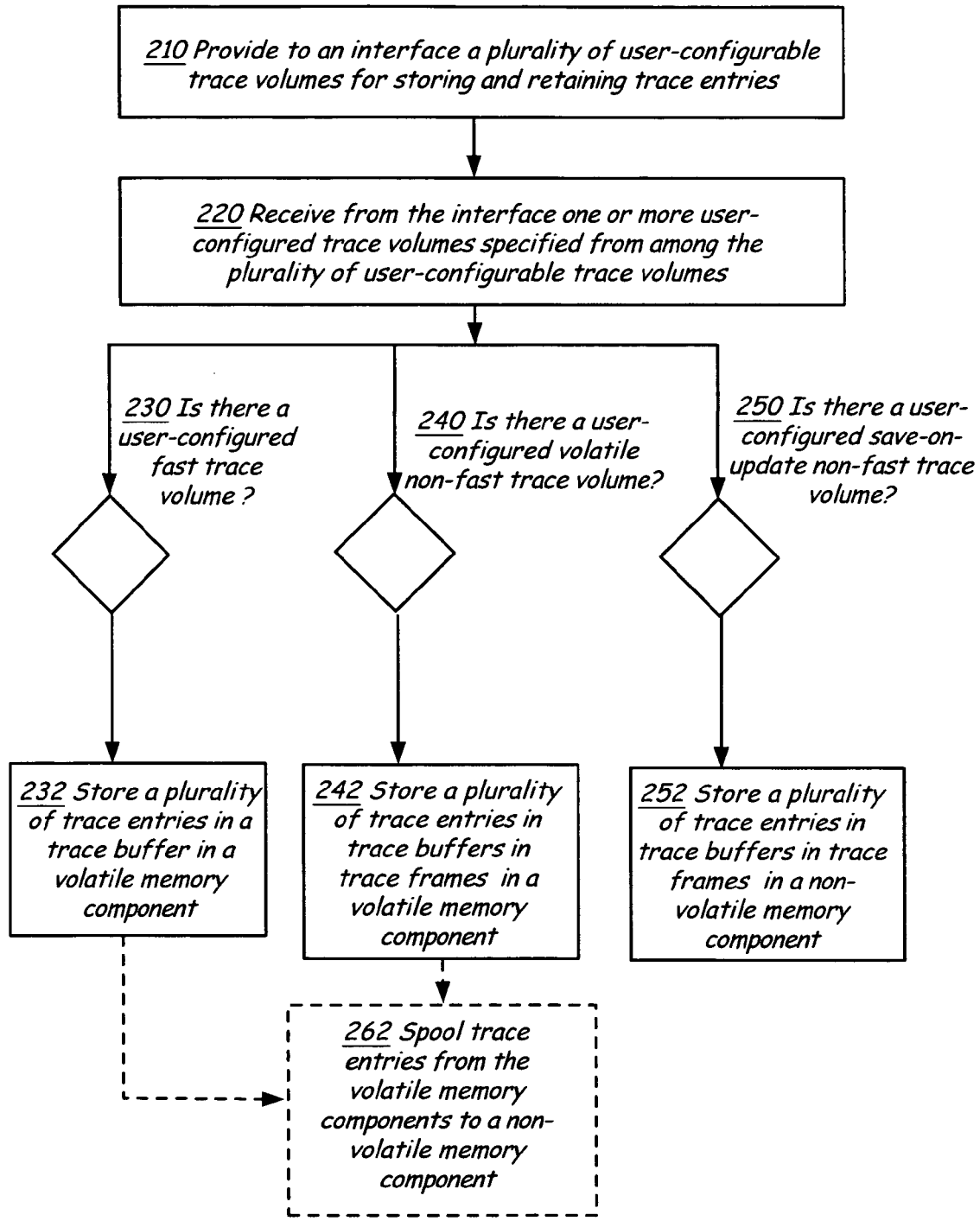
FIG. 4 schematically depicts a method according to an illustrative embodiment.

FIG. 4 depicts another illustrative embodiment of the invention, pertaining to a method which includes providing to an interface a plurality of user-configurable trace volumes for storing trace entries. The method also includes receiving from the interface a user-configured trace volume selected from among the plurality of user-configurable trace volumes. The trace volumes may specified by the user both as to which trace volumes or configurations are to be used, as well as what parameters are to be used within a given trace volume, in one illustrative embodiment. The method further includes storing a plurality of trace entries in accordance with the user-configured trace volume. The plurality of user-configurable trace volumes includes first, second and third trace volumes, and may include additional trace volumes.

In one illustrative embodiment, the first, second and third trace volumes operate as described above in reference to other embodiments. In the first trace volume, trace entries are stored to a trace buffer in a first volatile memory component. In the second trace volume, each trace entry is stored to a respective trace buffer among one or more trace buffers in a respective trace frame among one or more trace frames in a second volatile memory component. In the third trace volume, each trace entry is stored to a respective trace buffer among one or more trace buffers in a respective trace frame among one or more trace frames in a non-volatile memory component. In another illustrative embodiment, the method further includes the step of spooling at least some of the trace entries stored in the first volatile memory component or the second volatile memory component to the non-volatile memory component.

Figure 5:
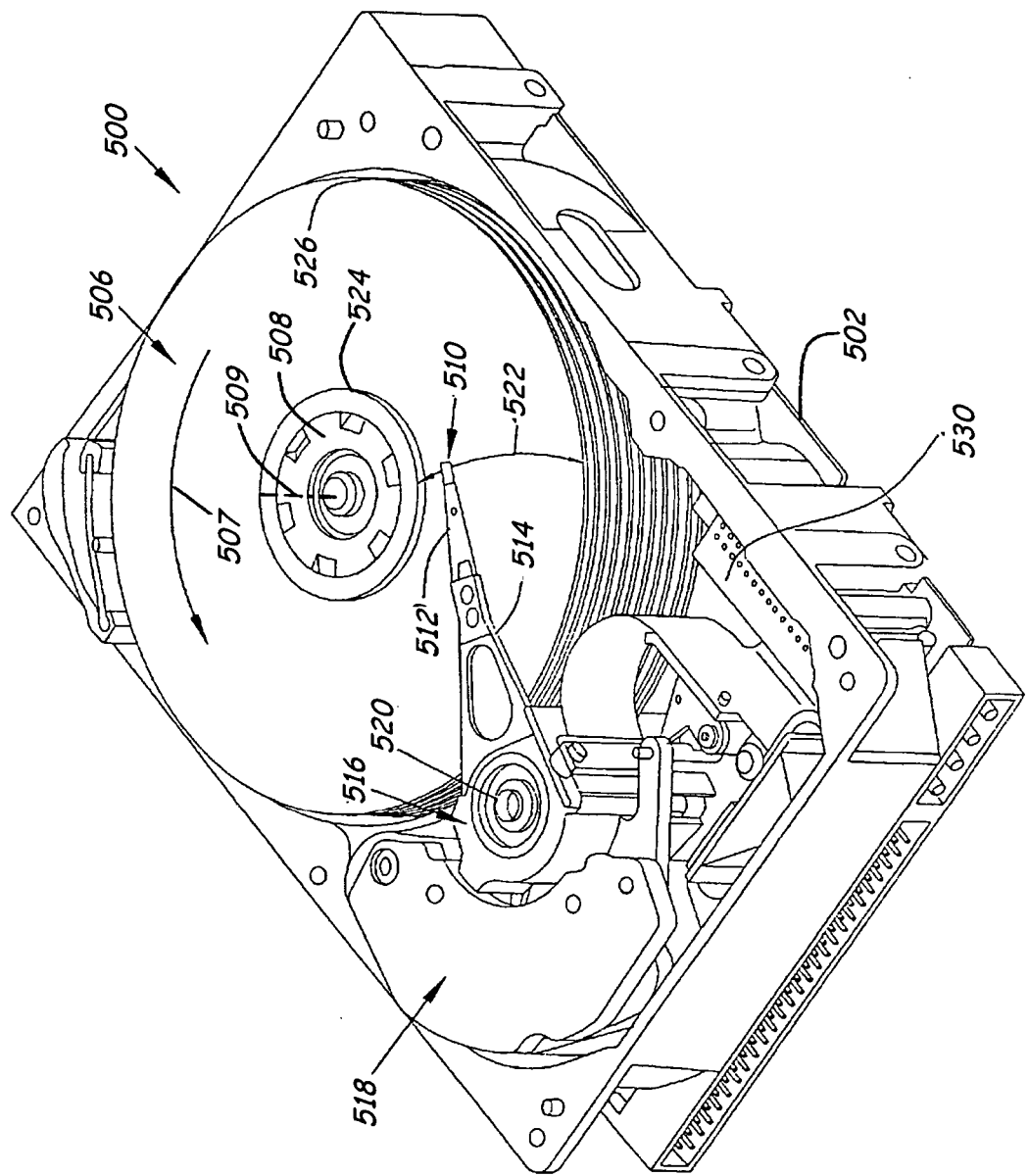
FIG. 5 depicts a system according to an illustrative embodiment.

FIG. 5 illustrates an oblique view of a disc drive 500 in which embodiments of the present invention are useful. Disc drive 500 includes a housing with a base 502 and a top cover (not shown). Disc drive 500 further includes a disc pack 506, which is mounted on a spindle motor (not shown) by a disc clamp 508. Disc pack 506 includes one or more individual discs, which are mounted for co-rotation in a direction indicated by arrow 507 about central axis 509. Each disc surface has an associated disc read/write head slider 510 which is mounted to disc drive 500 for communication with the disc surface. In the example shown in FIG. 5, sliders 510 are supported by suspensions 512 which are in turn attached to track accessing arms 514 of an actuator 516. The actuator 516 shown in FIG. 5 is of the type known as a rotary moving coil actuator and includes a voice coil motor (VCM), shown generally at 518. Voice coil motor 518 rotates actuator 516 with its attached read/write heads 510 about a pivot shaft 520 to position read/write heads 510 over a desired data track along an arcuate path 522 between a disc inner diameter 524 and a disc outer diameter 526. Voice coil motor 518 is driven by electronics 530 based on signals generated by read/write heads 510 and a host computer (not shown). The pivot shaft 520 mounts to a mounting pad on a base of the disc drive. In one illustrative example, electronics 530 comprise system 100, first volatile memory component 106, and second volatile memory component 108, while disc pack 506 comprises non-volatile memory component 110. First volatile memory component 106 and second volatile memory component 108 may be either separate memory devices or merely different portions of a single volatile memory device. In other embodiments, non-volatile memory component 110 may also be comprised in electronics 530, while in still other embodiments, any of first volatile memory component 106, second volatile memory component 108, and non-volatile memory component 110 may be disposed externally to electronics 530 or externally to disc drive 500 but configured to be in communicative connection with a system 100 contained in disc drive 500 during a debug operation.

One illustrative embodiment includes a computer-readable medium, permanently contained within a device, such as disc drive 500 for example, configured for reading the computer-readable medium and for storing data. In this embodiment, the computer-readable medium includes computer-executable instructions which, when executed by the device, configure the device to provide to an interface a plurality of user-configurable trace volumes for storing trace entries in the device. The computer-executable instructions also configure the device to receive from the interface a user-configured trace volume selected from among the plurality of user-configurable trace volumes. The computer-executable instructions further configure the device to store a plurality of trace entries in the device in accordance with the user-configured trace volume. The plurality of user-configurable trace volumes includes first, second and third trace volumes. The first trace volume includes storing at least some of the trace entries in a trace buffer in a first volatile memory component. The second trace volume includes storing at least some of the trace entries in a respective trace buffer among one or more trace buffers in a respective trace frame among one or more trace frames in a second volatile memory component. The third trace volume includes storing at least some of the trace entries to a respective trace buffer among one or more trace buffers in a respective trace frame among one or more trace frames in a non-volatile memory component.

The present invention therefore includes unexpected and novel advantages as detailed herein and as can be further appreciated from the claims, figures, and description by those skilled in the art. Although particular embodiments such as this are described in reference to a disc drive, the present invention has various other embodiments with application to other disc storage systems. It will be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of trace volumes, trace buffers, and trace frames, and different combinations of various features depicted and described in numerous embodiments, within the principles of the present invention, to the full extent indicated by the broad general meaning of the terms in which the appended claims are expressed.

For example, the particular elements may vary depending on the particular application in which the device is used, while maintaining substantially the same functionality without departing from the scope and spirit of the present invention. In addition, although some of the embodiments described herein are directed to a data storage device, such as a multiple disc system, it will be appreciated by those skilled in the art that the teachings of the present invention can be applied to a single disc system, an array of storage, or any other data storage or non-data storage application where the device is useful, without departing from the scope and spirit of the present invention.

What is claimed is:

1. A system comprising:
    a first set of trace entries and corresponding timestamps stored in in a first memory component, based on a first trace volume;
    a second set of trace entries and corresponding timestamps stored in a second memory component, based on a second trace volume; and
    parallel timestamps corresponding to the second set of trace entries stored in the first memory component to provide trace entry time correlation for the first set of trace entries and the second set of trace entries,
    wherein a bit-length of each of the timestamps corresponding to the first set of trace entries is different from a bit-length of each of the parallel timestamps,
    wherein the first trace volume is a user-configurable fast trace volume which provides fastest available trace storage and comprises spooling at least some of the first set of trace entries stored in the first memory component to the second memory component to provide longer-term storage and retention of the first set of trace entries, and the second trace volume is a user-configurable non-fast trace volume.

2. The system of claim 1, wherein the first and second memory components are volatile memory components.

3. The system of claim 2, wherein the first memory component has a rate of storage that is faster than a rate of storage of the second memory component.

4. The system of claim 3, wherein the first memory component spools at least some of the first set of trace entries to the second memory component.

5. The system of claim 4, wherein the first memory component spools at least some of the first set of trace entries in priority over other tasks being executed by the system.

6. The system of claim 2, wherein the first memory component and the second memory component are comprised in separate volatile memory devices.

7. The system of claim 1, further comprising:
    a third set of trace entries and corresponding timestamps stored in a third memory component; and
    parallel timestamps corresponding to the third set of trace entries stored in the first memory component.

8. The system of claim 7, wherein the third memory component comprises a non-volatile memory component.

9. The system of claim 7, wherein:
    the first memory component contains a trace buffer in which the first trace entries are stored;
    the second memory component contains the second set of trace entries in one or more trace buffers in one or more trace frames; and
    the third memory component contains the third set of trace entries in one or more trace buffers in one or more trace frames.

10. The system of claim 9, wherein one of the trace frames in the second memory component is a trigger capture trace frame of suitable size for a trigger capture trace entry, wherein the second memory component contiguously stores the trigger capture trace entry, responsively to a trigger, in the trigger capture trace frame.

11. The system of claim 10, wherein at least one of the trace frames in the second memory component is a fast wrap trace frame that comprises more than one trace buffer, wherein the second memory component stores trace entries in the trace buffers in the fast wrap trace frame at a rate that is fast relative to a rate at which the trace buffers are spooled from the trace frame to the third memory component, and stores new trace entries over older trace entries when the fast trace frame is full.

12. The system of claim 11, wherein at least one of the trace frames in the second memory component is a slow wrap trace frame that comprises more than one trace buffer, wherein the second memory component stores trace entries in the trace buffers in the slow wrap trace frame at a rate that is slow relative to a rate at which the trace buffers are spooled from the trace frame to the third memory component, and stores new trace entries over older trace entries when the slow trace frame is full.

13. The system of claim 12, wherein at least one of the trace frames in the second memory component is a non-wrap trace frame, wherein the second memory component stores trace entries in the trace buffers in the non-wrap trace frame until it is full, then stops the storing of new trace entries in the non-wrap trace frame.

14. The system of claim 9, wherein at least one of the trace frames in the third memory component is selected from the group consisting of a lifetime trace frame that comprises trace buffers with trace entries configured to persist for the lifetime of the system, wherein the trace buffers configured to persist for the lifetime of the system include a drive format trace buffer and a firmware download trace buffer; and a configuration and defect management history trace frame, comprising a plurality of trace buffers that may be overwritten, the plurality of trace buffers that may be overwritten including a Mode Select command trace buffer, a Log Select command buffer, and an automatic reassignments trace buffer.

15. The system of claim 7, wherein the second memory component spools at least some of the second set of trace entries to the third memory component.

16. The system of claim 1, wherein the bit-length of each of the timestamps corresponding to the first set of trace entries is 16 bits and wherein the bit-length of each of the parallel timestamps is of 64 bits.

17. A method comprising:
    providing a system comprising:
        a first memory component; and
        a second memory component;
    storing a first set of trace entries and corresponding timestamps in the first memory component, based on a first trace volume;
    storing a second set of trace entries and corresponding timestamps in the second memory component, based on a second trace volume; and
    storing parallel timestamps corresponding to the second set of trace entries in the first memory component to provide trace entry time correlation for the first set of trace entries and the second set of trace entries,
    wherein a bit-length of each of the timestamps corresponding to the first set of trace entries is different from a bit-length of each of the parallel timestamps,
    wherein the first trace volume is a user-configurable fast trace volume which provides fastest available trace storage and comprises spooling at least some of the first set of trace entries stored in the first memory component to the second memory component to provide longer-term storage and retention of the first set of trace entries, and the second trace volume is a user-configurable non-fast trace volume.

18. The method of claim 17, further comprising spooling at least some of the trace entries stored in the first memory component to the second memory component.

19. The method of claim 17, wherein:
    providing a system further comprises providing a system comprising a third memory component;
    the method comprises storing a third set of trace entries and corresponding timestamps in the third memory component; and
    storing parallel timestamps corresponding to the third set of trace entries in the first memory component.

20. A system comprising:
    a first set of trace entries stored in in a trace buffer in a first memory component;
    a second set of trace entries and corresponding timestamps stored in one or more trace buffers in one or more trace frames in a second memory component;
    a third set of trace entries and corresponding timestamps stored in one or more trace buffers in one or more trace frames in a third memory component; and
    parallel timestamps corresponding to the second set of trace entries and parallel timestamps corresponding to the third set of trace entries stored in the first memory component,
    wherein at least one of the trace frames in the third memory component is selected from the group consisting of a lifetime trace frame that comprises trace buffers with trace entries configured to persist for the lifetime of the system, wherein the trace buffers configured to persist for the lifetime of the system include a drive format trace buffer and a firmware download trace buffer; and a configuration and defect management history trace frame, comprising a plurality of trace buffers that may be overwritten, the plurality of trace buffers that may be overwritten including a Mode Select command trace buffer, a Log Select command buffer, and an automatic reassignments trace buffer.

* * * * *